United States Patent
Suzuki et al.

(10) Patent No.: US 9,896,042 B2
(45) Date of Patent: Feb. 20, 2018

(54) GROMMET AND WIRE HARNESS

(71) Applicants: Yazaki Corporation, Tokyo (JP);
TOYOTA JIDOSHA KABUSHIKI KAISHA, Toyota-shi, Aichi (JP)

(72) Inventors: Michihito Suzuki, Shizuoka (JP);
Naoto Kuzutani, Shizuoka (JP);
Mikiya Matsuoka, Aichi (JP);
Hirotaka Takasu, Aichi (JP); Kazuhiro Kusuyama, Okazaki (JP); Hiroki Shukuri, Miyoshi (JP)

(73) Assignees: YAZAKI CORPORATION, Minato-ku, Tokyo (JP); TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 15/129,064

(22) PCT Filed: Nov. 14, 2014

(86) PCT No.: PCT/JP2014/080225
§ 371 (c)(1),
(2) Date: Sep. 26, 2016

(87) PCT Pub. No.: WO2015/145861
PCT Pub. Date: Oct. 1, 2015

(65) Prior Publication Data
US 2017/0106817 A1    Apr. 20, 2017

(30) Foreign Application Priority Data

Mar. 27, 2014 (JP) ................................. 2014-065311

(51) Int. Cl.
*B60R 16/02* (2006.01)
*H02G 3/22* (2006.01)
(Continued)

(52) U.S. Cl.
CPC ....... *B60R 16/0222* (2013.01); *H01B 7/0045* (2013.01); *H02G 3/0468* (2013.01); *H02G 3/22* (2013.01)

(58) Field of Classification Search
CPC combination set(s) only.
See application file for complete search history.

(56) References Cited

U.S. PATENT DOCUMENTS

| | | | |
|---|---|---|---|
| 7,105,750 B1 * | 9/2006 | Duhr | ........... B60R 16/0222 16/2.1 |
| 2010/0115728 A1 | 5/2010 | Kamenoue | |
| 2015/0129303 A1 | 5/2015 | Shitamichi et al. | |

FOREIGN PATENT DOCUMENTS

| | | |
|---|---|---|
| CA | 2 747 792 A1 | 7/2010 |
| CN | 102239617 A | 11/2011 |

(Continued)

OTHER PUBLICATIONS

International Search Report for PCT/JP2014/080225 dated Jan. 6, 2015 [PCT/ISA/210].

(Continued)

*Primary Examiner* — Dhirubhai R Patel
(74) *Attorney, Agent, or Firm* — Sughrue Mion, PLLC (57) ABSTRACT

A grommet includes a bellows portion and a movable-member-side fitting portion connected with an end of the bellows portion. The movable-member-side fitting portion has an outer surface connected with the bellows portion and an inner surface formed on the opposite side of the outer surface. On the outer surface, the bellows portion is connected to the movable-member-side fitting portion with unequal distances from an axial center of the bellows portion to the outer edge of the movable-member-side fitting portion. Furthermore, on the outer surface, a first outer rib is formed that extends along a direction having a maximum (Continued)

distance from the axial center to the outer edge with an outer peripheral surface of the bellows portion serving as its base.

16 Claims, 4 Drawing Sheets

(51) Int. Cl.
    *H01B 7/00*     (2006.01)
    *H02G 3/04*     (2006.01)

(56) References Cited

FOREIGN PATENT DOCUMENTS

| JP | 2009-016182 A | 1/2009 |
| JP | 2009-269566 A | 11/2009 |
| JP | 2010-154601 A | 7/2010 |
| JP | 2012-115073 A | 6/2012 |
| JP | 2013-158171 A | 8/2013 |
| JP | 2013-258801 A | 12/2013 |

OTHER PUBLICATIONS

Written Opinion for PCT/JP2014/080225 dated Jan. 6, 2015 [PCT/ISA/237].

Communication dated May 3, 2017 from the State Intellectual Property Office of the P.R.C. in counterpart application No. 201480077559.2.

Communication dated Sep. 19 2017, from the Japanese Patent Office in counterpart application No. 2014-065311.

* cited by examiner

GROMMET AND WIRE HARNESS

CROSS REFERENCE TO RELATED APPLICATIONS

This application is a National Stage of International Application No. PCT/JP2014/080225 filed Nov. 14, 2014, claiming priority based on Japanese Patent Application No. 2014-065311 filed Mar. 27, 2014, the contents of all of which are incorporated herein by reference in their entirety.

FIELD

The present invention relates to a grommet and a wire harness.

BACKGROUND

Wire harnesses each consisting of a plurality of bundled wires are widely used for internal wiring in a building and for connection between vehicle devices. In routing a wire harness in a vehicle by having the wire harness penetrate a through-hole formed on a vehicle body panel and the like, such a configuration considering protection and water-proof of the wire harness is known that fits the fitting portion of a grommet with the through-hole and has the wire harness inserted inside a cylindrical portion integrally connected with the fitting portion. For example, Patent Literature 1 describes a method of fitting the fitting portion of a grommet with a through-hole by having a worker pull the cylindrical portion of the grommet, the fitting portion of which is disposed behind the through-hole with respect to the worker, toward the worker side.

CITATION LIST

Patent Literature

Patent Literature 1: Japanese Patent Application Laid-open No. 2009-16182

SUMMARY

Solution to Problem

In the case with a grommet with its cylindrical portion unaligned with the fitting portion, however, the above-described method has difficulty in properly installing the grommet to the through-hole because uneven force is transmitted to the outer edge of the fitting portion from the cylindrical portion.

As a solution to this problem, such a configuration is disclosed that provides a puller in a position relatively away from the cylindrical portion on the fitting portion and has the worker pull the puller and the cylindrical portion together. This configuration, however, problematically makes the device larger and more complicated and further degrades workability of installation because the worker needs to use both hands.

To overcome the above-described problems, it is an object of the present invention to provide a grommet and a wire harness with improved workability of installation.

Solution to Problem

In order to achieve the above mentioned object, a grommet according to the present invention includes a cylindrical portion configured to insert a wire of a wire harness into inside thereof, the wire harness being routed penetrating a through-hole; and a fitting portion configured to be connected with an end of the cylindrical portion and fitted with the through-hole, wherein the fitting portion has an outer surface connected with the cylindrical portion and an inner surface formed on an opposite side of the outer surface, on the outer surface, the cylindrical portion is connected to the fitting portion so that a distance from an axial center of the cylindrical portion to an outer edge of the fitting portion unequal, on the outer surface, a first outer rib is formed that extends along a direction in which a distance from the axial center of the cylindrical portion to the outer edge of the fitting portion is maximum, an outer peripheral surface of the cylindrical portion serving as a base, on the inner surface, a first inner rib is formed that extends along a same direction as the first outer rib and is connected with the outer edge of the fitting portion, and the first outer rib and the first inner rib are at least partly overlap with each other when viewed in a direction in which the outer surface and the inner surface are opposite to each other.

Further, in the grommet, it is preferable that the outer edge of the fitting portion has an elongated circle shape, the cylindrical portion is connected to the fitting portion so that the axial center of the cylindrical portion is shifted from a center of gravity of the elongated circle shape in a long axis direction, and the first outer rib is formed along a direction having a longer distance from the outer edge out of long axis directions of the elongated circle shape.

Further, in the grommet, it is preferable to further include at least a pair of second outer ribs that are axisymmetrically formed with the long axis of the elongated circle shape serving as an axis of symmetry and each configured to connect the outer peripheral surface of the cylindrical portion and the outer surface of the fitting portion, wherein each of the second outer ribs extends in a direction between a direction passing through the axial center of the cylindrical portion and parallel to a short axis of the elongated circle shape, and a direction in which the first outer rib extends.

Further, in the grommet, it is preferable to further include at least a pair of third outer ribs that are axisymmetrically formed with the long axis serving as an axis of symmetry and each configured to connect the outer peripheral surface of the cylindrical portion and the outer surface of the fitting portion, wherein each of the third outer ribs extends in a direction between the direction passing through the axial center of the cylindrical portion and parallel to the short axis of the elongated circle shape, and a direction opposite to the direction in which the first outer rib extends out of the long axis directions.

Further, in the grommet, it is preferable to further include a second inner rib that is formed on the inner surface of the fitting portion, configured to extend along a short axis direction of the elongated circle shape and to have both ends connected with the outer edge, wherein the first inner rib is formed in a manner connecting the second inner rib and the outer edge.

Further, in the grommet, it is preferable that the fitting portion includes a main body that is connected with the cylindrical portion at an end in an axis line direction of the cylindrical portion, a groove portion that is formed at another end of the main body in the axis line direction around an entire circumference of an outer edge of the main body, and a lip portion that is continuously formed from the groove portion, the outer surface is formed on the main body in a manner exposed on the cylindrical portion side in the axis line direction, the inner surface is formed on the main body in a manner exposed on an opposite side of the outer surface in the axis line direction, and the outer edge of the fitting portion corresponds to an outer shape of the fitting portion when viewed in the axis line direction.

In order to achieve the above mentioned object, a wire harness according to the present invention includes a wire configured to have an end connected with a coupling part and to be routed penetrating a through-hole; and a grommet configured to have a cylindrical portion inserting the wire into inside thereof and a fitting portion connected with an end of the cylindrical portion and fitted with the through-hole, wherein the fitting portion of the grommet has an outer surface connected with the cylindrical portion and an inner surface formed on an opposite side of the outer surface, on the outer surface, the cylindrical portion is connected to the fitting portion so that a distance from an axial center of the cylindrical portion to an outer edge of the fitting portion unequal, on the outer surface, a first outer rib is formed that extends along a direction in which a distance from the axial center of the cylindrical portion to the outer edge of the fitting portion is maximum, an outer peripheral surface of the cylindrical portion serving as a base, on the inner surface, a first inner rib is formed that extends along a same direction as the first outer rib and is connected with the outer edge of the fitting portion, and the first outer rib and the first inner rib are at least partly overlap with each other when viewed in a direction in which the outer surface and the inner surface are opposite to each other.

Advantageous Effects of Invention

According to the present invention, the configuration can eliminate the unevenness in the pulling force transmitted on the outer edge of the fitting portion and thus smoothly fit the fitting portion with the through-hole, which exerts advantageous effects in improving workability of installation.

DESCRIPTION OF EMBODIMENTS

An embodiment of a grommet according to the present invention will now be described with reference to the drawings. In the drawings, like numerals indicate like or corresponding members, the description of which will not be repeated.

Embodiment

Figure 1:
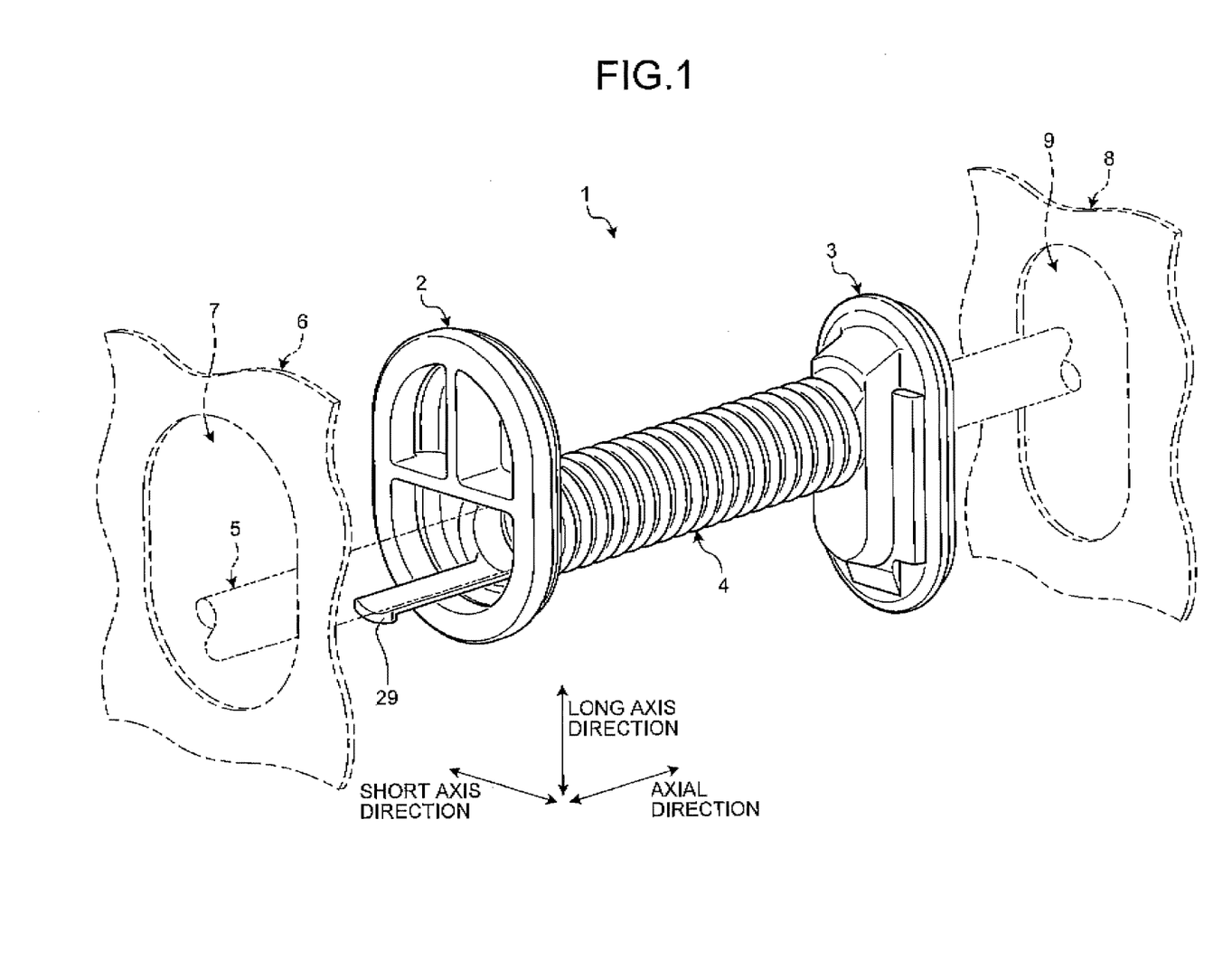
FIG. 1 is a schematic drawing that illustrates a general configuration of a grommet according to an embodiment of the present invention.

The entire configuration of the grommet according to an embodiment of the present invention will now be described with reference to FIGS. 1 and 2. FIG. 1 is a schematic drawing that illustrates the general configuration of the grommet according to an embodiment of the present invention, and FIG. 2 is a schematic drawing that illustrates the grommet of FIG. 1 viewed from the opposite side in the axial direction.

Figure 2:
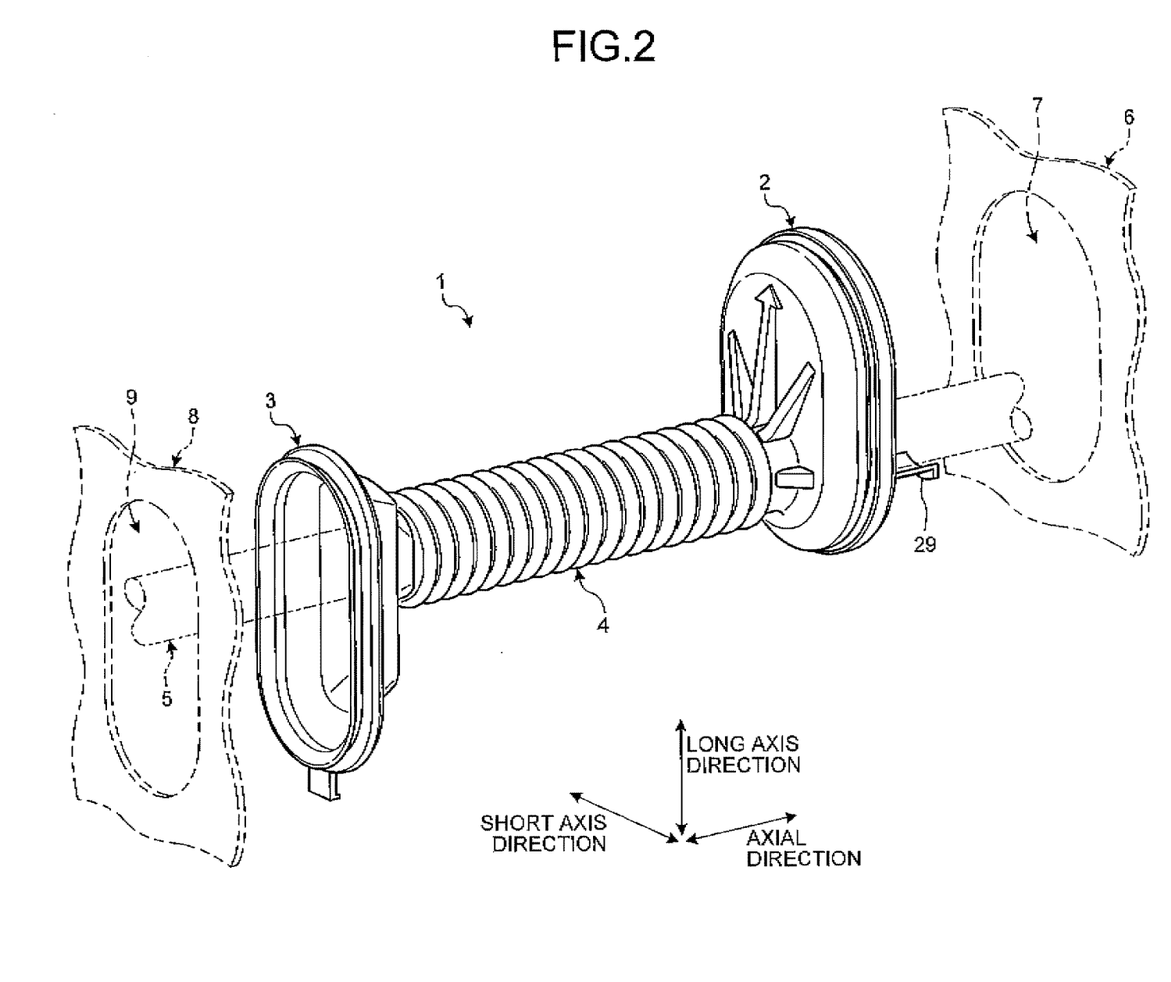
FIG. 2 is a schematic drawing that illustrates the grommet of FIG. 1 viewed from the opposite side in the axial direction.

A wire harness 5 illustrated in FIGS. 1 and 2 is an integral member in which a plurality of wires used for power supply and signal communication are bundled, for example, for internal wiring in a building and for connection between vehicle devices. The wire harness 5 puts the wires together by bundling the wires with an exterior part such as a corrugated tube and plastic tape and providing a coupling part such as a multi-core connector capable of connecting the wires together thereto at an end of the wires.

For example, in such an environment that a space between two areas is exposed outside, the wire harness 5 is disposed between the areas for electrically connecting the electrical instruments. A grommet 1 according to the embodiment is used for protection and water-proof of the wire harness 5 in a manner exteriorly installed around bundled wires of the wire harness 5 exposed outside. In the present embodiment, as illustrated in FIGS. 1 and 2, such an example configuration is described that the grommet 1 is installed between a vehicle body (a vehicle-side panel 8) and a movable member (a movable-member-side panel 6), examples of which may include a rear door, a trunk lid, and a side door of a front seat or a backseat, connected with the vehicle body with a hinge and the like interposed therebetween.

When the wire harness 5 is suspended between the vehicle body and the movable member, the wire harness 5 is particularly disposed in a position closer to the hinge of an opening of the vehicle body and is suspended between the vehicle body and the movable member. More specifically, the wire harness 5 is pulled outside through a vehicle-side through-hole 9 formed on the peripheral edge of the opening of the vehicle body and is guided inside the movable member through a movable-member-side through-hole (a through-hole) 7 formed in a position closer to the vehicle-side through-hole 9 on the peripheral edge of the movable member. The wire harness 5 is suspended between the through-holes in a loosened state and deformed by being bent between the vehicle body and the movable member with movement of the movable member.

The grommet 1 exteriorly installed to the wire harness 5 is made from an elastic material with low stiffness such as elastomer (rubber and the like). As illustrated in FIGS. 1 and 2, the grommet 1 includes a movable-member-side fitting portion (a fitting portion) 2, a vehicle-side fitting portion 3, a bellows portion (a cylindrical portion) 4, which are integrally formed.

The movable-member-side fitting portion 2 is configured in a manner fittable with the movable-member-side through-hole 7 formed on the movable-member-side panel 6. The vehicle-side fitting portion 3 is a circular member configured in a manner fittable with the vehicle-side through-hole 9 formed on the vehicle-side panel 8. The movable-member-side panel 6 is a movable member, and the vehicle-side panel 8 is a vehicle body exterior panel.

The outer edge of the movable-member-side fitting portion 2 has an elongated circle shape, which is the same shape as but larger (larger in major diameter and minor diameter) than the movable-member-side through-hole 7 when viewed in the axis line direction. Similarly, the outer edge of the vehicle-side fitting portion 3 has an elongated circle shape, which is the same shape as but larger (larger in major diameter and minor diameter) than the vehicle-side through-hole 9 when viewed in the axis line direction. The movable-member-side through-hole 7 and the vehicle-side through-hole 9 have an elongated circle shape in the example of FIGS. 1 and 2; however, a circular hole and an ellipsoidal hole are both applicable. If the movable-member-side through-hole 7 and the vehicle-side through-hole 9 have a shape other than the elongated circle shape, the movable-member-side fitting portion 2 and the vehicle-side fitting portion 3 have respective outer edges corresponding to the shapes of the movable-member-side through-hole 7 and the vehicle-side through-hole 9. The elongated circle shape described in the present embodiment is defined as a shape having a pair of straight line portions facing each other along the long axis and curved portions, which are substantially arced and that connect the straight line portions. As illustrated in FIGS. 1 and 2, the direction in which the wire harness 5 and the bellows portion 4 of the grommet 1 extend and the direction in which the movable-member-side through-hole 7 and the vehicle-side through-hole 9 are penetrated will be referred to as an "axial direction" or an "axis line direction". Furthermore, in FIGS. 1 and 2, the direction in which a long axis A1 (see FIG. 5) of the elongated circle shape of the movable-member-side fitting portion 2 extends will be referred to as a "long axis direction", whereas the direction in which a minor axis A2 (see FIG. 5) extends will be referred to as a "short axis direction".

The bellows portion 4 is disposed between the movable-member-side fitting portion 2 and the vehicle-side fitting portion 3. In this state, the bellows portion 4 is installed around the outer periphery of the wire portion of the wire harness 5 and is formed in a cylindrical shape having the wire harness 5 insertable therein. The bellows portion 4 has a large diameter portion and a small diameter portion alternately continuous in the longitudinal direction. In other words, the longitudinal sectional surface of the bellows portion 4 is formed in a concave-convex shape, thereby easily deformed by bending. The bellows portion 4 may be partly formed in a tubular shape (for example, a cylindrical shape) of uniform diameter along the longitudinal direction or may be entirely in a tubular shape. In the present embodiment, a "tubular portion" may be collectively used to describe a member formed in a tubular shape and bellows shape of the bellows portion 4 and having the wire harness 5 insertable in the member between the movable-member-side fitting portion 2 and the vehicle-side fitting portion 3.

The bellows portion 4 has an end connected to an outer surface 21a of the movable-member-side fitting portion 2 and penetrates from the outer surface 21a to an inner surface 21b side. Likewise, the bellows portion 4 has the other end connected to the outer surface of the vehicle-side fitting portion 3 and penetrates from the outer surface to the inner surface side. The movable-member-side fitting portion 2 and the vehicle-side fitting portion 3 are opened in directions opposite to each other along the axis line direction of the bellows portion 4. A space is formed from the opening in the inner surface side of the movable-member-side fitting portion 2 to the opening in the inner surface side of the vehicle-side fitting portion 3 through the inside of the bellows portion 4.

The cross-sectional surface of the bellows portion 4 is formed smaller than the cross-sectional surfaces of the movable-member-side fitting portion 2 and the vehicle-side fitting portion 3 when viewed in the axial direction of the bellows portion 4. In other words, the movable-member-side fitting portion 2 and the vehicle-side fitting portion 3 are formed at respective ends of the bellows portion 4 in a manner extending outward in the diameter direction of the bellows portion 4. The outer diameter of the bellows portion 4 is formed smaller than the outer diameters of the movable-member-side fitting portion 2 and the vehicle-side fitting portion 3 and is formed in the same size over the entire length.

The wire harness 5 is installed to the movable-member-side panel 6 with the movable-member-side fitting portion 2 of the grommet 1 fitted with the movable-member-side through-hole 7 and installed to the vehicle-side panel 8 with the vehicle-side fitting portion 3 fitted with the vehicle-side through-hole 9. In this state, the wire harness 5 is routed between the vehicle body and the movable member by penetrating the movable-member-side through-hole 7, the movable-member-side fitting portion 2 of the grommet 1, the bellows portion 4, the vehicle-side fitting portion 3, and the vehicle-side through-hole 9.

Figure 3:
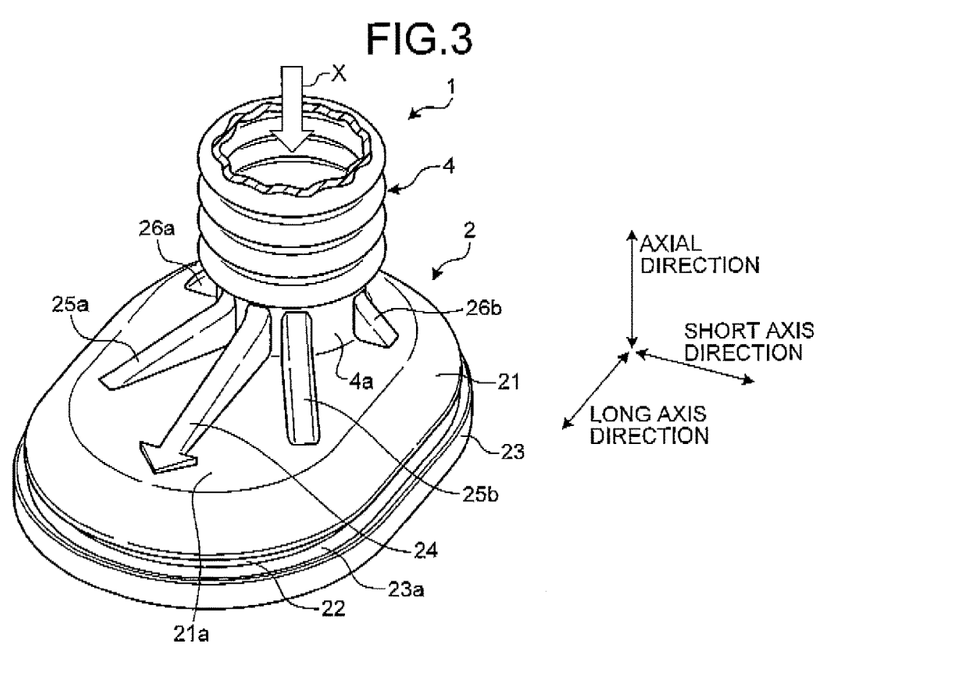
FIG. 3 is a schematic drawing that illustrates a general configuration of a movable-member-side fitting portion of the grommet in FIGS. 1 and 2.
Figure 4:
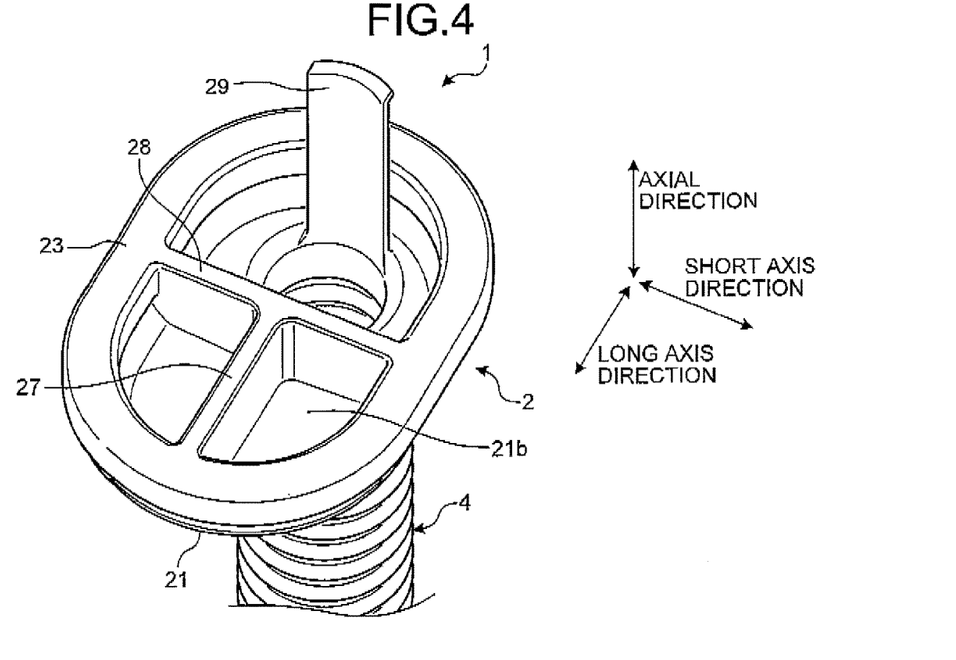
FIG. 4 is a schematic drawing that illustrates the movable-member-side fitting portion of FIG. 3 viewed from the opposite side in the axial direction.
Figure 5:
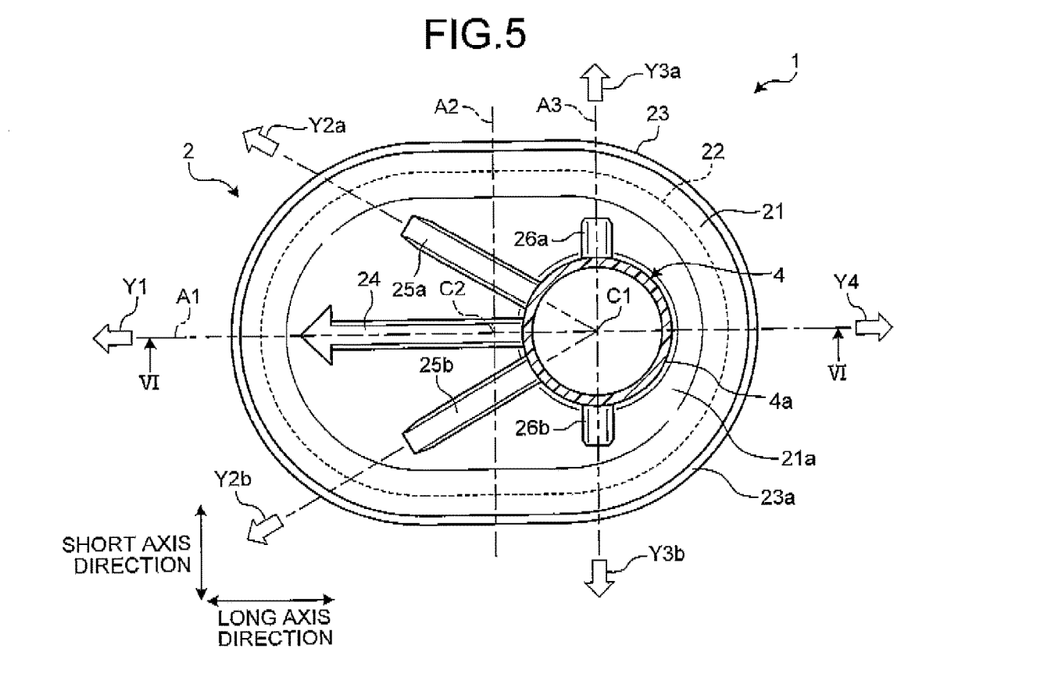
FIG. 5 is an arrow view in the X direction that illustrates the movable-member-side fitting portion of FIG. 3.
Figure 6:
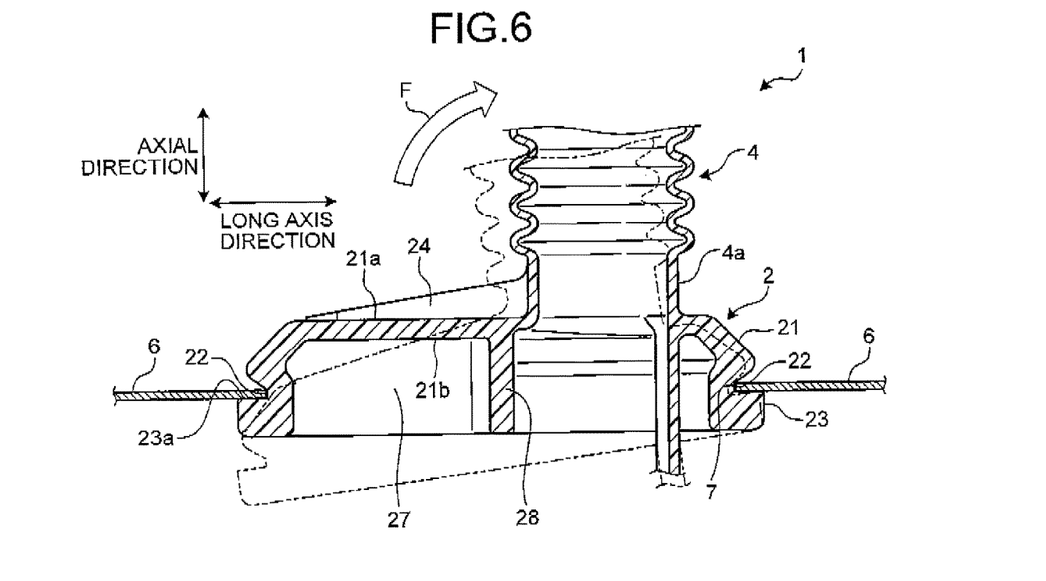
FIG. 6 is a cross-sectional view along the line VI-VI in FIG. 5 and an illustrative drawing of a procedure for fitting the movable-member-side fitting portion of the grommet with a movable-member-side through-hole.

The movable-member-side fitting portion 2 as an essential part according to the present embodiment will now be described in detail with reference to FIGS. 3 to 6. FIG. 3 is a schematic drawing that illustrates the general configuration of the movable-member-side fitting portion of the grommet of FIGS. 1 and 2. FIG. 4 is a schematic drawing that illustrates the movable-member-side fitting portion of FIG. 3 viewed from the opposite side in the axial direction. FIG. 5 is an arrow view in the X direction that illustrates the movable-member-side fitting portion of FIG. 3. FIG. 6 is a cross-sectional view along the line VI-VI in FIG. 5 and an illustrative drawing of a procedure of fitting the movable-member-side fitting portion of the grommet with the movable-member-side through-hole.

The movable-member-side fitting portion 2 includes a main body 21, a groove portion 22, and a lip portion 23 as illustrated in FIGS. 3 to 6.

The main body 21 is connected with an end of the bellows portion 4. The main body 21 has an outer surface 21a exposed toward the outside of the vehicle and an inner surface 21b exposed toward the inside of the movable member (inside of the vehicle) when the movable-member-side fitting portion 2 is fitted with the movable-member-side through-hole 7. The outer surface 21a and the inner surface 21b correspond to a main surface and the other main surface of a single panel member as illustrated in FIG. 6. The outer surface 21a and the inner surface 21b are disposed opposite to each other in the axial direction. Specifically, the outer surface 21a is formed in an end of the main body 21 in the axial direction and exposed toward the direction of the bellows portion 4 and the vehicle-side fitting portion 3, whereas the inner surface 21b is exposed toward the opposite direction in the axial direction. The main body 21 has the outer surface 21a connected with the bellows portion 4. The outer edge of the main body 21 has an elongated circle shape, which is the same shape as but larger (larger in major diameter and minor diameter) than the movable-member-side through-hole 7 when viewed in the axis line direction. Furthermore, the main body 21 is a substantially elongated circle cylindrical shaped member having a bottom. More specifically, the main body 21 has an elongated circle shaped bottom wall and a side wall extending in the axial direction.

The groove portion 22 is formed around the entire circumference of the outer edge of the main body 21 at the other end (an end in the inner surface 21b side) of the main body 21 in the axial direction. The groove portion 22 is circularly formed on a virtual plane perpendicular to the axial direction. The groove portion 22 is disposed between the main body 21 and the lip portion 23 in the axial direction and is particularly formed in a shape concaved toward the center (toward the direction of the center of gravity of the body when viewed in the axial direction) with respect to the outer peripheral surfaces of the main body 21 and the lip portion 23. The movable-member-side fitting portion 2 can be fitted with the movable-member-side through-hole 7 with the bottom surface of the groove portion 22 contacting with the inner peripheral surface of the movable-member-side through-hole 7 and with the peripheral edge of the movable-member-side through-hole 7 fit into the groove portion 22. In this configuration, the bottom surface shape of the groove portion 22 is substantially the same as the shape of the movable-member-side through-hole 7 when viewed in the axial direction.

The lip portion 23 is formed opposite to the main body 21 across the groove portion 22 in the axial direction and is formed continuously from the groove portion 22 around the entire circumference of the groove portion 22. Similar to the groove portion 22, the lip portion 23 is circularly formed around the entire circumference of the outer edge of the main body 21. Furthermore, the lip portion 23 is formed in a manner projecting outward (in a direction away from the center of gravity of the main body when viewed in the axial direction) from the bottom surface of the groove portion 22. Similar to the main body 21, the outer edge of the lip portion 23 has an elongated circle shape, which is the same shape as but larger (larger in major diameter and minor diameter) than the movable-member-side through-hole 7 when viewed in the axis line direction. It is preferable that the outer edge shape of the lip portion 23 viewed in the axis line direction be formed larger than the main body 21. When the movable-member-side fitting portion 2 is installed to the movable-member-side through-hole 7, a circular panel side end surface 23a formed along the groove portion 22 contacts with the surface of the movable-member-side panel 6. This configuration can keep the connection between the lip portion 23 and the movable-member-side panel 6 watertight.

The words "the outer edge of the movable-member-side fitting portion 2" in the present embodiment can be replaced by the outer edge of the main body 21 or the outer edge of the lip portion 23 when viewed in the axial direction. The vehicle-side fitting portion 3 has like components corresponding to the main body 21, the groove portion 22, and the lip portion 23 of the movable-member-side fitting portion 2. These components enable the vehicle-side fitting portion 3 to fit with the vehicle-side through-hole 9. The detailed description about the configuration of the vehicle-side fitting portion 3 will be omitted.

As illustrated in FIGS. 3 and 4, in the present embodiment, the bellows portion 4 is connected with the movable-member-side fitting portion 2 with its axial direction perpendicular to the outer surface 21a of the main body 21. In other words, the bellows portion 4 and the movable-member-side fitting portion 2 are connected with each other in such a manner that the axial direction of the bellows portion 4 is substantially parallel to the normal direction (the direction in which the outer surface 21a and the inner surface 21b are opposite to each other) of the outer surface 21a and the inner surface 21b of the main body 21. Likewise, the bellows portion 4 is connected with the vehicle-side fitting portion 3 with its axial direction perpendicular to the vehicle-side fitting portion 3. The connection between the bellows portion 4 and the movable-member-side fitting portion 2 and the connection between the bellows portion 4 and the vehicle-side fitting portion 3 are not limited to the above-described manner. In another manner of connection, the axial direction of the bellows portion 4 may be inclined to the outer surface 21a. In the present embodiment, the word "connected" used to describe such a case in which the bellows portion 4 is connected with the movable-member-side fitting portion 2 and the vehicle-side fitting portion 3 includes various kinds of features. As an example case of connection, the movable-member-side fitting portion 2, the vehicle-side fitting portion 3, and the bellows portion 4 may be integrally formed from the same material. In another case, the movable-member-side fitting portion 2, the vehicle-side fitting portion 3, and the bellows portion 4 may be separately formed from respective materials and thereafter attached to one another.

The movable-member-side fitting portion 2 has an elongated plate-like harness fixing piece 29 projecting from the inner peripheral surface of the bellows portion 4 toward a direction away from the bellows portion 4 along the axial direction. In the state of contacting with the outer periphery of the wires of the wire harness 5 disposed through the bellows portion 4, the harness fixing piece 29 can fix the wire harness 5 by being bound together with tape or the like from the outer peripheral side.

With the grommet 1 according to the present embodiment, the bellows portion 4 is connected to the main body 21 with unequal distances from the axial center C1 of the bellows portion 4 to the outer edge of the movable-member-side fitting portion 2 on the outer surface 21a of the main body 21 of the movable-member-side fitting portion 2. More specifically, as illustrated in FIG. 5, the bellows portion 4 is connected to the main body 21 in such a manner that the axial center C1 of the bellows portion 4 is shifted from a center of gravity C2 (the center position of the elongated circle) of the elongated circle outer edge of the movable-member-side fitting portion 2 in the long axis direction. In other words, the axial center C1 of the bellows portion 4 is disposed at a position different from the center of gravity position C2 on a long axis A1 of the elongated circle outer edge of the movable-member-side fitting portion 2. In other words, the grommet 1 according to the present embodiment has the bellows portion 4 eccentrically connected to the movable-member-side fitting portion 2.

In the present embodiment, the grommet 1 having the bellows portion 4 eccentrically connected to the movable-member-side fitting portion 2 further includes a first outer rib 24 formed on the outer surface 21a of the main body 21 of the movable-member-side fitting portion 2 with an outer peripheral surface 4a of the bellows portion 4 serving as its base. The first outer rib 24 extends along a direction with a maximum distance from the axial center C1 of the bellows portion 4 to the outer edge of the movable-member-side fitting portion 2. More specifically, as illustrated in FIG. 5, the first outer rib 24 is formed along a direction Y1 with a longer distance from the axial center C1 to the outer edge out of the long axis directions of the elongated circle outer edge of the movable-member-side fitting portion 2. It is preferable that the first outer rib 24 be formed with an end in the extending direction located near the outer edge of the movable-member-side fitting portion 2 and particularly be formed with the end located closer toward the outer edge. The first outer rib 24 can be formed with its base end side connected with the outer peripheral surface 4a of the bellows portion 4 and with its front end side connected with the outer edge of the movable-member-side fitting portion 2.

Furthermore, on the outer surface 21a of the main body 21 of the movable-member-side fitting portion 2, a pair of second outer ribs 25a and 25b each connecting between the outer peripheral surface 4a of the bellows portion 4 and the outer surface 21a of the main body 21 are formed in axisymmetric positions with a long axis A1 of the elongated circle shape of the outer edge of the movable-member-side fitting portion 2 serving as an axis of symmetry. Extending directions Y2a and Y2b of the second outer ribs 25a and 25b, respectively, are axisymmetrically formed with the long axis A1 serving as an axis of symmetry and are each arranged between the extending direction Y1 of the first outer rib 24 and a direction (the extending direction of a straight line A3 in FIG. 5) passing through the axial center C1 of the bellows portion 4 and parallel to a short axis A2 of the elongated circle shape. The second outer ribs 25a and 25b are formed in the extending directions Y2a and Y2b, respectively. With this configuration, when the first outer rib 24 receives a pulling force in the bellows portion 4 side (for example, when the bellows portion 4 is pulled in the right direction in FIG. 5), the second outer ribs 25a and 25b similarly receive the pulling force in the bellows portion 4 side. The extending directions Y2a and Y2b of the second outer ribs 25a and 25b intersect with each other at the axial center C1 when further extended from the outer peripheral surface 4a of the bellows portion 4, which serves as a base of the ribs, toward the axial center side.

Furthermore, on the outer surface 21a of the main body 21 of the movable-member-side fitting portion 2, a pair of third outer ribs 26a and 26b each connecting between the outer peripheral surface 4a of the bellows portion 4 and the outer surface 21a of the main body 21 are formed in positions axisymmetric with the long axis A1 of the elongated circle shape of the outer edge of the movable-member-side fitting portion 2 serving as an axis of symmetry and different from the positions of the second outer ribs 25a and 25b. Extending directions Y3a and Y3b of the third outer ribs 26a and 26b, respectively, are arranged between a direction (the extending direction of the straight line A3 in FIG. 5) passing through the axial center C1 of the bellows portion 4 and parallel to the short axis and a direction Y4 opposite to the extending direction Y1 of the first outer rib 24 out of the long axis directions. In the examples of FIGS. 3 to 6, the extending directions Y3a and Y3b of the third outer ribs 26a and 26b are arranged as one direction of the extending direction and the other direction of the extending direction of the straight line A3. Specifically, the third outer ribs 26a and 26b are formed in the extending directions Y3a and Y3b, respectively. With this configuration, when the first outer rib 24 receives a pulling force in the bellows portion 4 side (for example, when the bellows portion 4 is pulled in the right direction in FIG. 5), contrary to the first outer rib 24, the third outer ribs 26a and 26b receive a compression force from the bellows portion 4. The extending directions Y3a and Y3b of the third outer ribs 26a and 26b intersect with each other at the axial center C1 when further extended from the outer peripheral surface 4a of the bellows portion 4, which serves as a base of the ribs, toward the axial center side.

The first outer rib 24, the second outer ribs 25a and 25b, and the third outer ribs 26a and 26b project from the outer surface 21a of the main body 21 toward the axial direction with the thickness in a substantially constant width and are integrally formed with the movable-member-side fitting portion 2. With regard to the second outer ribs 25a and 25b and the third outer ribs 26a and 26b, at least a pair of ribs need to be formed. Two or more pairs may also be applicable. In another configuration, either a pair of second outer ribs 25a and 25b or a pair of third outer ribs 26a and 26b may not be formed, or neither of the pairs may be formed.

As illustrated in FIGS. 4 and 6, a first inner rib 27 extending along the same direction as the first outer rib 24 and connecting with the outer edge of the movable-member-side fitting portion 2 is formed on the inner surface 21b of the main body 21 of the movable-member-side fitting portion 2. The first inner rib 27 at least partly overlaps with the first outer rib 24 when viewed in the axial direction. In other words, the first outer rib 24 and the first inner rib 27 at least partly overlap with each other when viewed in a direction in which the outer surface 21a and the inner surface 21b of the main body 21 are opposite to each other. Furthermore, on the inner surface 21b, a second inner rib 28 is formed in a manner extending along the short axis of the elongated circle shape of the outer edge of the movable-member-side fitting portion 2 and having both ends connected with the outer edge. The first inner rib 27 is disposed in a manner connecting the second inner rib 28 and the outer edge. In other words, the first inner rib 27 and the second inner rib 28 are connected with each other to form substantially a T-shape when viewed in the axial direction. The first inner rib 27 and the second inner rib 28 project from the inner surface 21b of the main body 21 to the end surface level of the lip portion 23 in the axial direction with the thickness in a substantially constant width and are integrally formed with the movable-member-side fitting portion 2.

A procedure of fitting the movable-member-side fitting portion 2 of the grommet 1 with the movable-member-side through-hole 7 will now be described with reference to FIG. 6. With the grommet 1 according to the present embodiment, in fitting the movable-member-side fitting portion 2 with the movable-member-side through-hole 7, the entire movable-member-side fitting portion 2 is first inserted into the movable member through the movable-member-side through-hole 7. When the worker holds the bellows portion 4 and pulls the bellows portion 4 toward the outside of the vehicle (in the direction of the vehicle-side fitting portion 3), the main body 21 of the movable-member-side fitting portion 2 is pulled outside the vehicle first from a portion of a shorter distance (the direction Y4 in FIG. 5) from the axial center C1 of the bellows portion 4 to the outer edge of the movable-member-side fitting portion 2 through the movable-member-side through-hole 7. This is because the grommet 1 according to the present embodiment has the axial center C1 of the bellows portion 4 shifted from the center of gravity C2 of the movable-member-side fitting portion 2 as described above. The inner peripheral surface of the movable-member-side through-hole 7 fits into a corresponding portion of the groove portion 22, which is the first pulled-out portion on the main body 21. This positional relation between the movable-member-side fitting portion 2 and the movable-member-side through-hole 7 is illustrated with an alternate long and two short dashes line in FIG. 6.

When the worker further pulls the bellows portion 4 from this state, as illustrated in FIG. 6, the pulling force applied on the bellows portion 4 generates a rotational force F, which has the fitted portion of the groove portion 22 and the movable-member-side through-hole 7 serve as the center of rotation, on the movable-member-side fitting portion 2. With the rotational force, the rest portion of the main body 21 of the movable-member-side fitting portion 2, which is a portion of a longer distance (the direction Y1 in FIG. 5) from the axial center C1 of the bellows portion 4 to the outer edge of the movable-member-side fitting portion 2, is pulled outside the vehicle through the movable-member-side through-hole 7. With this process, the inner peripheral surface of the movable-member-side through-hole 7 entirely fits into the groove portion 22, and the movable-member-side fitting portion 2 is accordingly fitted with the movable-member-side through-hole 7. This positional relation between the movable-member-side fitting portion 2 and the movable-member-side through-hole 7 is illustrated with a solid line in FIG. 6.

The following is a description about advantageous effects exerted by the grommet 1 according to the present embodiment in the above-described fitting process of the movable-member-side fitting portion 2 with the movable-member-side through-hole 7.

As earlier described, the grommet 1 according to the present embodiment includes the bellows portion 4 that has wires of the wire harness 5, which are routed through the movable-member-side through-hole 7, disposed inside thereof, and the movable-member-side fitting portion 2 that is connected with an end of the bellows portion 4 and fitted with the movable-member-side through-hole 7. The movable-member-side fitting portion 2 has the outer surface 21a connected with the bellows portion 4, and the inner surface 21b formed on the opposite side of the outer surface 21a. On the outer surface 21a, the bellows portion 4 is connected to the movable-member-side fitting portion 2 with unequal distances from the axial center C1 of the bellows portion 4 to the outer edge of the movable-member-side fitting portion 2. Furthermore, the first outer rib 24 is formed on the outer surface 21a in such a manner that it extends along the direction Y1 having a maximum distance from the axial center C1 of the bellows portion 4 to the outer edge of the movable-member-side fitting portion 2 with the outer peripheral surface 4a of the bellows portion 4 serving as its base. The first inner rib 27 is formed on the inner surface 21b in such a manner that it extends along the same direction as the first outer rib 24 and is connected with the outer edge of the movable-member-side fitting portion 2. In this configuration, the first outer rib 24 and the first inner rib 27 at least partly overlap with each other when viewed in a direction in which the outer surface 21a and the inner surface 21b of the main body 21 are opposite to each other. More specifically, the outer edge of the movable-member-side fitting portion 2 has an elongated circle shape, and the bellows portion 4 is connected to the movable-member-side fitting portion 2 (the main body 21) with the axial center C1 of the bellows portion 4 shifted from the center of gravity C2 of the elongated circle shape to the long axis directions. The first outer rib 24 is formed along the direction Y1 of a longer distance from the outer edge to the bellows portion 4 out of the long axis directions of the elongated circle shape.

Generally, with such a configuration that the axial center C1 of the bellows portion 4 does not coincide with the center of gravity C2 of the movable-member-side fitting portion 2, that is, with the configuration in which the bellows portion 4 is eccentrically connected to the movable-member-side fitting portion 2, the pulling force received by the bellows portion 4 is difficult to be transmitted to the furthest part on the outer edge from the axial center C1. Installation of the grommet 1 may be thus difficult. The grommet 1 according to the present embodiment, however, includes the first outer rib 24 on the outer surface 21a along the direction Y1 of a maximum distance from the axial center C1 of the bellows portion 4 to the outer edge of the movable-member-side fitting portion 2, and the first inner rib 27 on the inner surface 21b. With this configuration, the outer peripheral surface 4a of the bellows portion 4 is directly connected with the first outer rib 24, and the first outer rib 24 and the first inner rib 27 are connected with each other with the outer surface 21a and the inner surface 21b of the main body 21 interposed therebetween. The first inner rib 27 is directly connected with the outer edge of the movable-member-side fitting portion 2. The pulling force on the bellows portion 4 is transmitted to the first outer rib 24 through the outer peripheral surface 4a of the bellows portion 4, then transmitted to the first inner rib 27 from the first outer rib 24 through the outer surface 21a and the inner surface 21b of the main body 21, and thereafter transmitted to the outer edge of the movable-member-side fitting portion 2 from the first inner rib 27. This configuration can easily transmit the pulling force from the bellows portion 4 even to the furthest part, transmission of the pulling force to which has been conventionally most difficult, from the axial center C1 of the bellows portion 4 on the outer edge of the movable-member-side fitting portion 2. This configuration can eliminate unevenness in the pulling force transmitted to the outer edge of the movable-member-side fitting portion 2 and thus can more smoothly fit the movable-member-side fitting portion 2 with the movable-member-side through-hole 7. Moreover, this configuration can decrease the amount of pulling force and distance necessary for the worker pulling the bellows portion 4 for installing the grommet 1. The worker can therefore easily fit the movable-member-side fitting portion 2 of the grommet 1 with the movable-member-side through-hole 7, which improves workability for installing the grommet 1.

With the grommet 1 having the bellows portion 4 eccentrically connected to the movable-member-side fitting portion 2 as in the present embodiment, a conventional method is known that facilitates fitting of the movable-member-side fitting portion 2 with the movable-member-side through-hole 7 by parallel arranging a puller and the bellows portion 4 on the outer surface 21a of the movable-member-side fitting portion 2. With this configuration, the worker pulls the bellows portion 4 and the puller together, which can equalize the pulling force transmitted to the outer edge of the movable-member-side fitting portion 2. This configuration, however, problematically makes the fitting portion larger and more complicated and increases the number of installation processes because the worker needs to use both hands. With the grommet 1 according to the present embodiment, the first outer rib 24 and the first inner rib 27 allow the worker to pull the bellows portion 4 only with one hand to fit the movable-member-side fitting portion 2 of the grommet 1 with the movable-member-side through-hole 7, which can reduce the number of installation processes. No necessity of using a dedicated member such as the puller for the installation process can make the grommet 1 smaller and simpler.

With the grommet 1 having the bellows portion 4 eccentrically connected to the movable-member-side fitting portion 2 as in the present embodiment, another conventional method is known that facilitates fitting of the movable-member-side fitting portion 2 with the movable-member-side through-hole 7 by applying lubricant between the movable-member-side fitting portion 2 and the movable-member-side through-hole 7. The configuration of the grommet 1 in the present embodiment having the first outer rib 24 and the first inner rib 27 exerts advantageous effects in facilitating the fitting operation and thus reduces the amount of applied lubricant.

The grommet 1 according to the present embodiment further includes a pair of the second outer ribs 25a and 25b formed in axisymmetric positions with a long axis A1 of the elongated circle shape of the outer edge of the movable-member-side fitting portion 2 serving as an axis of symmetry and each connecting the outer peripheral surface 4a of the bellows portion 4 and the outer surface 21a of the movable-member-side fitting portion 2. Extending directions Y2a and Y2b of the second outer ribs 25a and 25b, respectively, are each disposed between the extending direction Y1 of the first outer rib 24 and a direction (the extending direction of the straight line A3 in FIG. 5) passing through the axial center C1 of the bellows portion 4 and parallel to the short axis A2 of the elongated circle shape.

This configuration achieves more efficient transmission of the pulling force to the outer edge of the movable-member-side fitting portion 2 through the first outer rib 24 and a pair of the second outer ribs 25a and 25b, thereby further eliminating unevenness in the pulling force transmitted to the outer edge of the movable-member-side fitting portion 2.

In the present embodiment, the first outer rib 24, a pair of the second outer ribs 25a and 25b, and a pair of the third outer ribs 26a and 26b are separately formed on the outer surface 21a of the movable-member-side fitting portion 2. This configuration can keep the thickness of the main body 21 in the axial direction small except for areas where the ribs are formed, thereby ensuring flexibility of the movable-member-side fitting portion 2. Even though the stiffness of the movable-member-side fitting portion 2 is partly increased by adding another rib, the movable-member-side fitting portion 2 can be suitably deformed by being warped when fitted with the movable-member-side through-hole 7. This configuration can prevent degradation in workability for installing the grommet 1.

The grommet 1 according to the present embodiment further includes a pair of the third outer ribs 26a and 26b formed in axisymmetric positions with the long axis A1 of the elongated circle shape of the outer edge of the movable-member-side fitting portion 2 serving as an axis of symmetry and each connecting the outer peripheral surface 4a of the bellows portion 4 and the outer surface 21a of the movable-member-side fitting portion 2. Extending directions of the third outer ribs 26a and 26b are arranged between a direction (the extending direction of the straight line A3 in FIG. 5) passing through the axial center C1 of the bellows portion 4 and parallel to the short axis A2 of the elongated circle shape and the direction Y4 opposite to the extending direction of the first outer rib 24 out of the long axis directions.

With the grommet 1 according to the present embodiment having the bellows portion 4 eccentrically connected to the movable-member-side fitting portion 2, when the bellows portion 4 is pulled, the area with the first outer rib 24 and a pair of the second outer ribs 25a and 25b on the outer surface 21a of the movable-member-side fitting portion 2 is pulled toward the axial direction, whereas the opposite side area across the bellows portion 4 is pressed. If the stiffness of the movable-member-side fitting portion 2 is decreased with an increase in the size of the movable-member-side fitting portion 2, the pressed area on the movable-member-side fitting portion 2 may be problematically deformed by being warped. The grommet 1 according to the present embodiment further includes a pair of the third outer ribs 26a and 26b as described above. These ribs can keep the area pressed responding to pulling of the bellows portion 4 on the movable-member-side fitting portion 2 stiff. This configuration can control deformation by warpage and therefore efficiently transmit the pulling force to the outer edge side. Consequently, this configuration further facilitates fitting of the movable-member-side fitting portion 2 of the grommet 1 with the movable-member-side through-hole 7.

The grommet 1 according to the present embodiment further includes the second inner rib 28 that is formed on the inner surface 21b of the movable-member-side fitting portion 2, extends along the short axis direction of the elongated circle shape of the outer edge of the movable-member-side fitting portion 2, and has both ends connected with the outer edge of the movable-member-side fitting portion 2. The first inner rib 27 is formed in a manner connecting the second inner rib 28 and the outer edge of the movable-member-side fitting portion 2.

If the stiffness of the movable-member-side fitting portion 2 is low, when the bellows portion 4 is pulled toward the outside of the vehicle in fitting the movable-member-side fitting portion 2 with the movable-member-side through-hole 7, the movable-member-side fitting portion 2 may be problematically deformed by being warped in a direction in which the minor diameter is narrowed. The grommet 1 according to the present embodiment includes the second inner rib 28 as described above. The rib can keep the movable-member-side fitting portion 2 stiff in the short axis direction, thereby suppressing deformation by warpage. Furthermore, by connecting an end of the first inner rib 27 with the second inner rib 28, the second inner rib 28 serves as a base of the first inner rib 27. Another element serving as a base of the first inner rib 27 thus does not need to be separately provided in the movable-member-side fitting portion 2.

The movable-member-side fitting portion 2 of the grommet 1 according to the present embodiment includes the main body 21 having an end in the axis line direction of the bellows portion 4 connected with the bellows portion 4 and includes, at the other end of the main body 21 in the axis line direction, the groove portion 22 formed around the entire circumference of the outer edge of the main body 21 and the lip portion 23 continuously formed from the groove portion 22. The outer surface 21a of the movable-member-side fitting portion 2 is formed on the main body 21 in a manner exposed in the bellows portion 4 side in the axis line direction, whereas the inner surface 21b of the movable-member-side fitting portion 2 is formed on the main body 21 in a manner exposed on the opposite side of the outer surface 21a in the axis line direction. The outer edge of the movable-member-side fitting portion 2 corresponds to the outer shape of the same when viewed in the axis line direction. This configuration enables the movable-member-side fitting portion 2 to be suitably fitted with the movable-member-side through-hole 7.

As described above, the wire harness 5 according to the present embodiment includes wires having an end connected with a coupling part and routed through the movable-member-side through-hole 7 (and the vehicle-side through-hole 9), and the grommet 1 according to the present embodiment exteriorly installed around the wires. With the first outer rib 24 and the first inner rib 27 formed on the grommet 1 in the wire harness 5, the movable-member-side fitting portion 2 of the grommet 1 can be easily fitted with the movable-member-side through-hole 7 in routing the wire harness 5. These ribs can improve workability for installing the grommet 1.

An embodiment of the present invention has been described as above; however, the embodiment is only an example and is not intended to limit the scope of this invention. The embodiment can be implemented in various other forms and can be omitted, replaced, and changed without departing from the spirit of the invention. The above-described embodiment and its modifications are included in the scope and the spirit of the invention and included in the scope of the invention indicated in the appended claims and its equivalents.

Of the two fitting portions of the grommet 1 of the above-described embodiment, the movable-member-side fitting portion 2 as one of the fitting portions has the first outer rib 24, a pair of the second outer ribs 25a and 25b, a pair of the third outer ribs 26a and 26b, the first inner rib 27, and the second inner rib 28. In another configuration, the vehicle-side fitting portion 3 as the other fitting portion may also have the same ribs. Contrary to the above-described embodiment, the vehicle-side fitting portion 3 may have the first outer rib 24, a pair of the second outer ribs 25a and 25b, a pair of the third outer ribs 26a and 26b, the first inner rib 27, and the second inner rib 28.

In the above-described embodiment, such an example configuration has been described that has an end of the first inner rib 27 connected with the outer edge of the movable-member-side fitting portion 2 and the other end connected with the second inner rib 28 with the second inner rib 28 serving as a base of the first inner rib 27; however, another component serving as the base of the first inner rib 27 may be formed in the movable-member-side fitting portion 2. For example, the bellows portion 4 may be extended further from the inner surface 21b in the axial direction and have an end of the first outer rib 24 connected to the extended portion. In other words, an end of the first inner rib 27 may directly contact with the bellows portion 4 with the bellows portion 4 serving as a base of the first inner rib 27.

In the embodiment, the outer edge of the movable-member-side fitting portion 2 is in an elongated circle shape; however, the outer edge shape of the movable-member-side fitting portion 2 is not limited to the elongated circle shape as long as the bellows portion 4 is connected to the movable-member-side fitting portion 2 with unequal distances from the axial center C1 of the bellows portion 4 to the outer edge of the movable-member-side fitting portion 2 on the outer surface 21a of the movable-member-side fitting portion 2. For example, the outer edge of the movable-member-side fitting portion 2 may be circular shape, and the bellows portion 4 is eccentrically connected to the movable-member-side fitting portion 2 with the axial center C1 of the bellows portion 4 shifted from the center of gravity of the circle. In another configuration, the outer edge of the movable-member-side fitting portion 2 may be an elongated circle shape, and the bellows portion 4 may be connected to the movable-member-side fitting portion 2 with the axial center C1 of the bellows portion 4 coinciding with the center of gravity of the elongated circle. The movable-member-side fitting portion 2 may have an outer edge in a shape different from the above-described axisymmetric shape including an elongated circle, a circle, and an ellipse with at least two axes of symmetry. Examples of the shape may include an elongated circle with the curves facing each other in different curvature and an elongated circle with the minor axis between the straight lines continuously varying.

REFERENCE SIGNS LIST

1 Grommet
2 Movable-member-side fitting portion (fitting portion)
21 Main body
21a Outer surface
21b Inner surface
22 Groove portion
23 Lip portion
24 First outer rib
25a and 25b Second outer ribs
26a and 26b Third outer ribs
27 First inner rib
28 Second inner rib
4 Bellows portion (cylindrical portion)
4a Outer peripheral surface
5 Wire harness
7 Movable-member-side through-hole (through-hole)
C1 Axial center
C2 Center of gravity

The invention claimed is:

1. A grommet comprising:
a cylindrical portion configured to insert a wire of a wire harness into an inside thereof, the wire harness being routed so as to penetrate a through-hole of a moveable-member side panel; and
a fitting portion configured to be connected with an end of the cylindrical portion and fitted with the through-hole, wherein
the fitting portion has an outer surface connected with the cylindrical portion and an inner surface formed on an opposite side of the outer surface,
on the outer surface, the cylindrical portion is connected to the fitting portion so that distances from an axial center of the cylindrical portion to an outer edge of the fitting portion are unequal,
on the outer surface, a first outer rib is formed that extends along a direction in which a distance from the axial center of the cylindrical portion to the outer edge of the fitting portion is maximum, an outer peripheral surface of the cylindrical portion serving as a base,
on the inner surface, a first inner rib is formed that extends along a same direction as the first outer rib and is connected with the outer edge of the fitting portion,
the first outer rib and the first inner rib at least partly overlap with each other when viewed in a direction in which the outer surface and the inner surface are opposite to each other, and
a second inner rib is formed on the inner surface of the fitting portion and has both ends connected with the outer edge of the fitting portion, and the first inner rib connects the second inner rib and the outer edge of the fitting portion.

2. The grommet according to claim 1, wherein
the outer edge of the fitting portion has a circular shape,
the cylindrical portion is eccentrically connected to the fitting portion so that the axial center of the cylindrical portion is shifted from a center of gravity of the circular shape, and
the first outer rib is formed in a direction in which a distance from the axial center of the cylindrical portion to the outer edge of the fitting portion is maximum.

3. The grommet according to claim 2, wherein
the outer edge of the fitting portion has an elongated circle shape,
the cylindrical portion is connected to the fitting portion so that the axial center of the cylindrical portion is shifted from a center of gravity of the elongated circle shape in a long axis direction, and
the first outer rib is formed along a direction having a longer distance from the outer edge out of long axis directions of the elongated circle shape.

4. The grommet according to claim 2, wherein
the fitting portion includes
a main body that is connected with the cylindrical portion at an end in an axis line direction of the cylindrical portion,
a groove portion that is formed at another end of the main body in the axis line direction around an entire circumference of an outer edge of the main body, and
a lip portion that is continuously formed from the groove portion,
the outer surface is formed on the main body in a manner exposed on the cylindrical portion side in the axis line direction, the inner surface is formed on the main body in a manner exposed on an opposite side of the outer surface in the axis line direction, and the outer edge of the fitting portion corresponds to an outer shape of the fitting portion when viewed in the axis line direction.

5. The grommet according to claim 1, wherein
the outer edge of the fitting portion has an elongated circle shape,
the cylindrical portion is connected to the fitting portion so that the axial center of the cylindrical portion is shifted from a center of gravity of the elongated circle shape in a long axis direction, and
the first outer rib is formed along a direction having a longer distance from the outer edge out of long axis directions of the elongated circle shape.

6. The grommet according to claim 5, further comprising:
at least a pair of second outer ribs that are axisymmetrically formed with the long axis of the elongated circle shape serving as an axis of symmetry and each configured to connect the outer peripheral surface of the cylindrical portion and the outer surface of the fitting portion, wherein
each of the second outer ribs extends in a direction between a direction passing through the axial center of the cylindrical portion and parallel to a short axis of the elongated circle shape, and a direction in which the first outer rib extends.

7. The grommet according to claim 6, further comprising:
at least a pair of third outer ribs that are axisymmetrically formed with the long axis serving as an axis of symmetry and each configured to connect the outer peripheral surface of the cylindrical portion and the outer surface of the fitting portion, wherein
each of the third outer ribs extends in a direction between the direction passing through the axial center of the cylindrical portion and parallel to the short axis of the elongated circle shape, and a direction opposite to the direction in which the first outer rib extends out of the long axis directions.

8. The grommet according to claim 5, wherein
the second inner rib extends along a short axis direction of the elongated circle shape.

9. The grommet according to claim 8, wherein
the fitting portion includes
a main body that is connected with the cylindrical portion at an end in an axis line direction of the cylindrical portion,
a groove portion that is formed at another end of the main body in the axis line direction around an entire circumference of an outer edge of the main body, and
a lip portion that is continuously formed from the groove portion,
the outer surface is formed on the main body in a manner exposed on the cylindrical portion side in the axis line direction,
the inner surface is formed on the main body in a manner exposed on an opposite side of the outer surface in the axis line direction, and
the outer edge of the fitting portion corresponds to an outer shape of the fitting portion when viewed in the axis line direction.

10. The grommet according to claim 6, wherein
the second inner rib extends along a short axis direction of the elongated circle shape.

11. The grommet according to claim 7, further wherein
the second inner rib extends along a short axis direction of the elongated circle shape.

12. The grommet according to claim 5, wherein
the fitting portion includes
a main body that is connected with the cylindrical portion at an end in an axis line direction of the cylindrical portion,
a groove portion that is formed at another end of the main body in the axis line direction around an entire circumference of an outer edge of the main body, and
a lip portion that is continuously formed from the groove portion,
the outer surface is formed on the main body in a manner exposed on the cylindrical portion side in the axis line direction,
the inner surface is formed on the main body in a manner exposed on an opposite side of the outer surface in the axis line direction, and
the outer edge of the fitting portion corresponds to an outer shape of the fitting portion when viewed in the axis line direction.

13. The grommet according to claim 1, wherein
the fitting portion includes
a main body that is connected with the cylindrical portion at an end in an axis line direction of the cylindrical portion,
a groove portion that is formed at another end of the main body in the axis line direction around an entire circumference of an outer edge of the main body, and
a lip portion that is continuously formed from the groove portion,
the outer surface is formed on the main body in a manner exposed on the cylindrical portion side in the axis line direction,
the inner surface is formed on the main body in a manner exposed on an opposite side of the outer surface in the axis line direction, and
the outer edge of the fitting portion corresponds to an outer shape of the fitting portion when viewed in the axis line direction.

14. The grommet according to claim 6, wherein
the fitting portion includes
a main body that is connected with the cylindrical portion at an end in an axis line direction of the cylindrical portion,
a groove portion that is formed at another end of the main body in the axis line direction around an entire circumference of an outer edge of the main body, and
a lip portion that is continuously formed from the groove portion,
the outer surface is formed on the main body in a manner exposed on the cylindrical portion side in the axis line direction,
the inner surface is formed on the main body in a manner exposed on an opposite side of the outer surface in the axis line direction, and
the outer edge of the fitting portion corresponds to an outer shape of the fitting portion when viewed in the axis line direction.

15. The grommet according to claim 7, wherein
the fitting portion includes
a main body that is connected with the cylindrical portion at an end in an axis line direction of the cylindrical portion,
a groove portion that is formed at another end of the main body in the axis line direction around an entire circumference of an outer edge of the main body, and a lip portion that is continuously formed from the groove portion, the outer surface is formed on the main body in a manner exposed on the cylindrical portion side in the axis line direction, the inner surface is formed on the main body in a manner exposed on an opposite side of the outer surface in the axis line direction, and the outer edge of the fitting portion corresponds to an outer shape of the fitting portion when viewed in the axis line direction.

16. A wire harness comprising:

a wire configured to have an end connected with a coupling part and to be routed so as to penetrate a through-hole of a movable-member side panel; and a grommet configured to have a cylindrical portion inserting the wire into an inside thereof and a fitting portion connected with an end of the cylindrical portion and fitted with the through-hole, wherein the fitting portion of the grommet has an outer surface connected with the cylindrical portion and an inner surface formed on an opposite side of the outer surface, on the outer surface, the cylindrical portion is connected to the fitting portion so that distances from an axial center of the cylindrical portion to an outer edge of the fitting portion are unequal, on the outer surface, a first outer rib is formed that extends along a direction in which a distance from the axial center of the cylindrical portion to the outer edge of the fitting portion is maximum, an outer peripheral surface of the cylindrical portion serving as a base, on the inner surface, a first inner rib is formed that extends along a same direction as the first outer rib and is connected with the outer edge of the fitting portion, the first outer rib and the first inner rib are at least partly overlap with each other when viewed in a direction in which the outer surface and the inner surface are opposite to each other, and a second inner rib is formed on the inner surface of the fitting portion and has both ends connected with the outer edge of the fitting portion, and the first inner rib connects the second inner rib and the outer edge of the fitting portion.

* * * * *